C. R. EDWARDS.
Game-Board.

No. 165,410.

Patented July 13, 1875.

Attest:
Charles Bodine Otty
Charles S. Demarest

Inventor:
Charles R. Edwards

UNITED STATES PATENT OFFICE

CHARLES R. EDWARDS, OF BUFFALO, NEW YORK.

IMPROVEMENT IN GAME-BOARDS.

Specification forming part of Letters Patent No. 165,410, dated July 13, 1875; application filed February 28, 1875.

*To all whom it may concern:*

Be it known that I, CHARLES R. EDWARDS, of Buffalo, in the county of Erie and State of New York, have invented a new and instructive Amusement-Board, of which the following is a specification:

My invention combines a means and method of instruction with amusement. It consists of an ordinary checker-board provided with pictured squares, in combination with checkermen having corresponding pictures, as will hereinafter more fully appear, for the purpose of playing a game called "proverbs."

Figure 2:
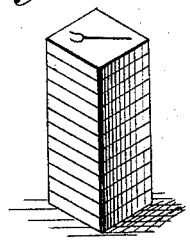
Figure 1:
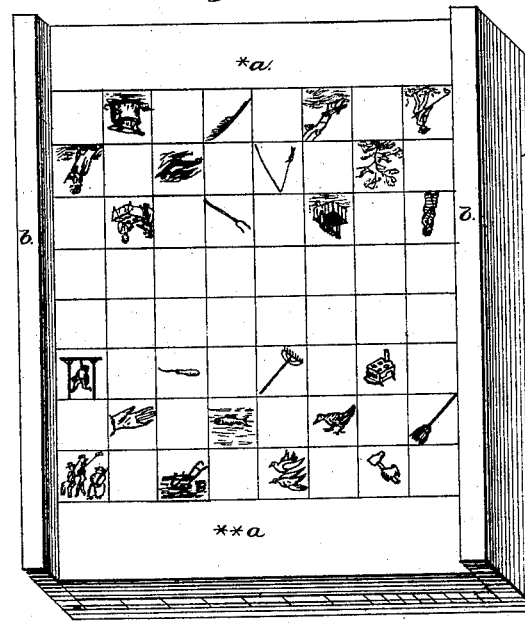
Figure 3:
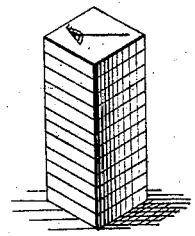

Figure 1 is a view of a board with the well-known arrangement of squares for the play of checkers or chess, but having also the enigmatical pictures for a new play of setting and guessing proverbs, and for a new game of proverbs; Fig. 2, the twelve men to be set on the *a side of the proverbs, each man on the picture like his own, the pitchfork on the pitchfork, and so on; Fig. 3, the twelve men for the other side, **a, each man also on the picture like his own—the rake on the rake, &c.

For the play of guessing proverbs we proceed as follows: Suppose you take the *a side. Now you have set down one of your men—say the pitchfork. I then try to think what proverb the pitchfork indicates; and looking among my men I see the picture of a hay-rake, and set my rake man on the rake-square, the **a side, and announce the proverb, "Make hay when the sun shines."

Having thus matched your man and guessed the proverb, it will be my turn to select and set a proverb for you to match and guess. Proceed thus, and he who guesses the most wins the play, and both will remember the proverbs. The other proverbs and how indicated are as follows:

"Many hands make light work"—the three laborers; the one laborer.

"He who by the plow would thrive, must either hold himself or drive"—the plow; the plow-handles and hands.

"Birds of a feather flock together"—two birds on the wing; the feather.

"Strike while the iron is hot"—the sledge-hammer; the anvil.

"A bird in the hand is worth two in the bush"—the hand; the bush.

"There are as good fish in the sea as any that have been caught"—a fish in water; part of fish-pole and line.

"The early bird catches the worm"—a bird on the ground; the angle-worm.

"A new broom sweeps clean"—the broom; the girl.

"No rogue e'er felt the halter draw with good opinion of the law"—the gallows; man in prison clothes.

"All is well that ends well"—an awl; a well-curb.

"Make hay when the sun shines"—the rake; the pitchfork.

"Too many cooks spoil the broth"—the cook-stove; two cooks and stove.

When all the men are set we are ready to begin the real game of proverbs.

In order to give additional interest I relate to the learner that I have imagined that twenty-four men were engaged in teaching the same proverbs; but on account of the proverbs being a little differently understood as to their practical application in a few things, the teachers fell into a dispute, divided themselves into two parties of twelve men each, and began a learned contest, which resulted in showing that all of them were more or less in error, so that some returned to school, and others were sent home as unfit for teachers. It was claimed that the side having the most men sent home was defeated.

We begin this game by moving as in checkers, but as soon as you jump one of my men you hand it to me. I look at his picture; it happens to be the hay-rake. I next look on the board, hoping to find my lost man's original place—the rake-square—unoccupied, for then I shall set my man there face downward, and count him only as a teacher sent back to school; but if the rake-square be occupied he must be taken off the board, counted as unfit to teach, and sent home. The square where any man has been set face downward is counted as nothing, and the place next beyond is the proper one to move to or jump over. A few plain men are provided extra to set under the men who become kings or professors by reaching the king-row. The men which have the right to be returned to their original squares, face down, are counted saved; but, if the players prefer, such men may be put off the board and counted saved if kept apart from the other men counted lost. In this case all the squares continue in use.

On the other side of the board may be arranged squares for the same purpose, but with other enigmatical pictures or words or marks to designate the men and their places. Excepting for that part of the game which consists in setting the men while guessing the proverbs, the same game may be played, having the squares and checker-men correspondingly marked by any substitutes for the enigmatical devices. Also, boards may be manufactured with different sets of proverbs. It is preferable for fairness to have like proverbs indicated on corresponding squares.

One method of manufacturing the men is to take book-binders' board or wood-board about one-eighth inch thick, and firmly paste upon one side a sheet of paper upon which has first been printed the enigmatical pictures; then cut the board into blocks of suitable size. Or the men may be turned with a smooth flat surface sunk in the face side, and the picture pasted therein.

I claim as my invention—

A game-board divided into squares, the alternate squares being provided with enigmatical pictures suggestive of proverbs, in combination with checker-men, each having a picture corresponding with one on the board, substantially as and for the purposes set forth.

CHARLES R. EDWARDS.

Witnesses:
    CHARLES B. DOTY,
    CHARLES S. DEMAREST.